Feb. 7, 1967  J. N. RUDDELL ETAL  3,302,385
MODIFICATION OF FILAMENTS

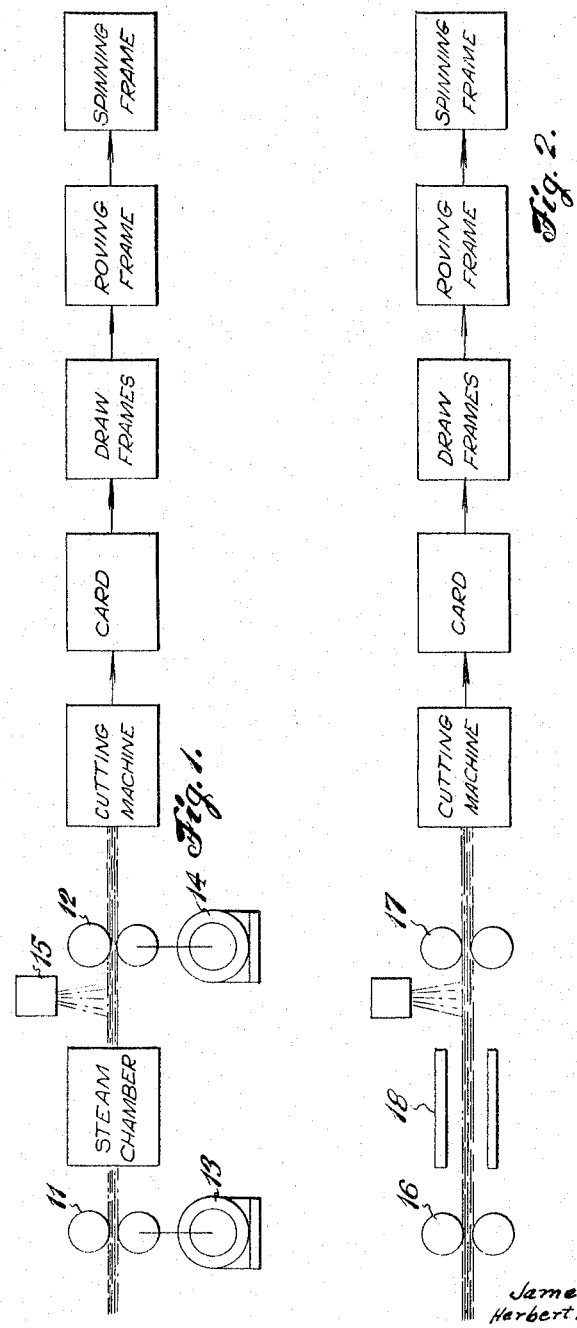

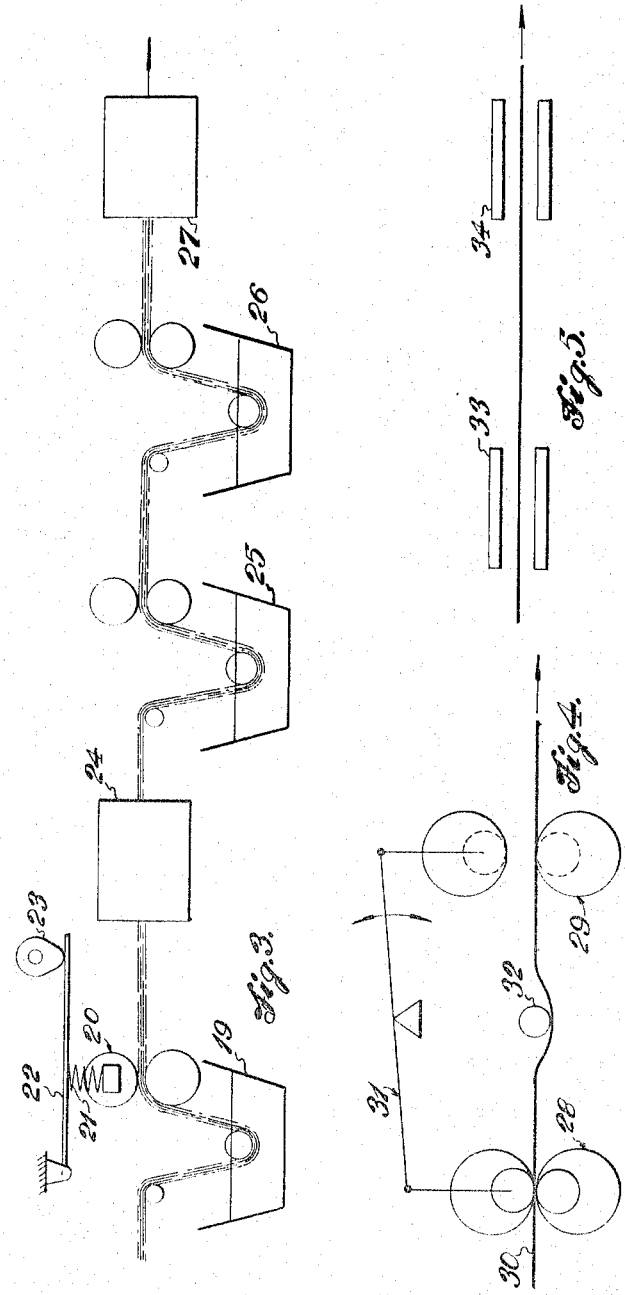

Filed Aug. 23, 1962  6 Sheets-Sheet 5

INVENTORS
James Nelson Ruddell and
Herbert Alexander Conway Todo
BY
Watson, Cole, Grindle & Watson
Attys.

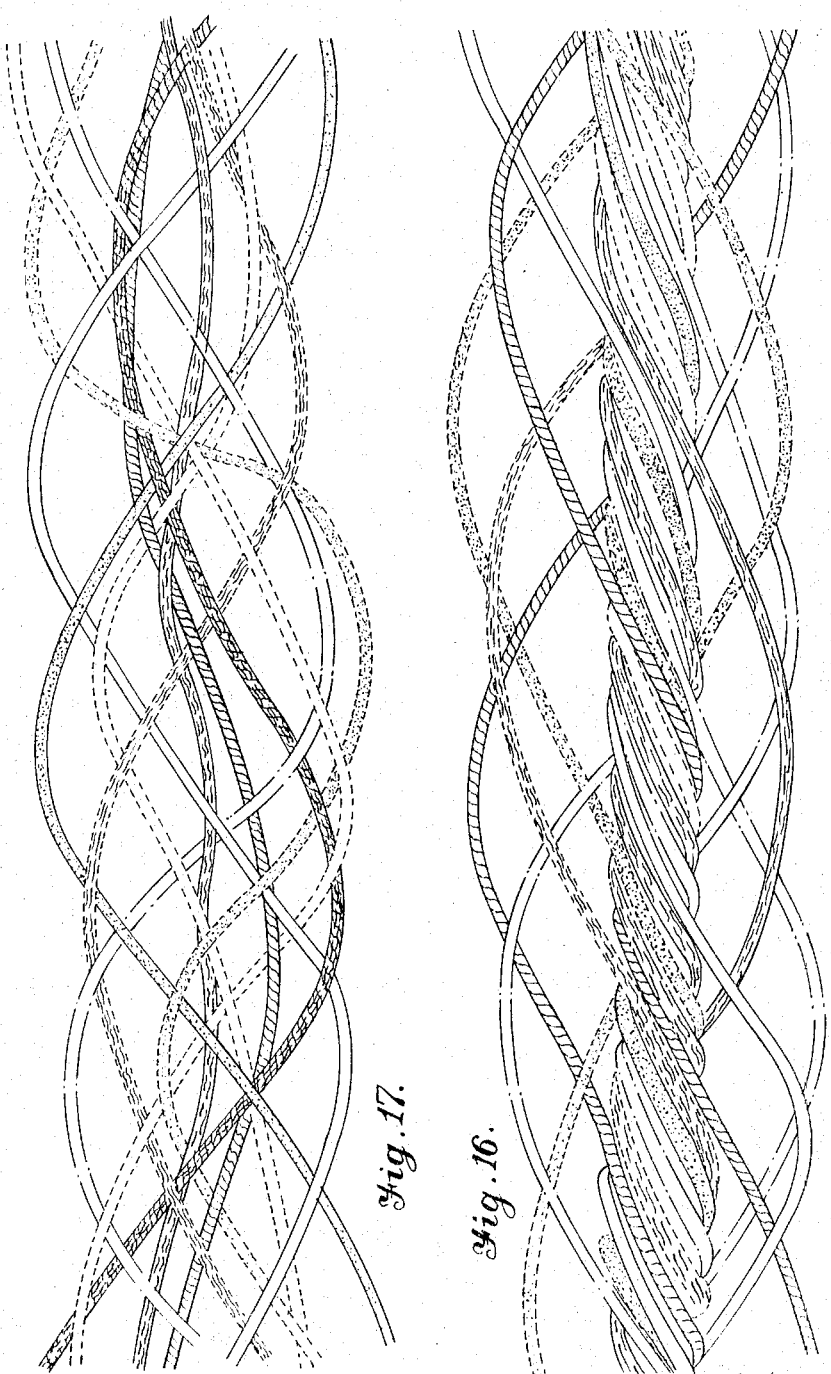

United States Patent Office 3,302,385
Patented Feb. 7, 1967

3,302,385
MODIFICATION OF FILAMENTS
James Nelson Ruddell, 19 Glenroy Ave., Portadown, County Armagh, Northern Ireland, and Herbert Alexander Conway Todd, 28 Cranmore Gardens, Belfast, Northern Ireland
Filed Aug. 23, 1962, Ser. No. 219,048
Claims priority, application Great Britain, Aug. 26, 1961, 1,796/61
13 Claims. (Cl. 57—157)

This invention concerns the modification of filaments forming or capable of forming assemblies of filaments such as tows, slivers, yarns and fabrics and is a continuation-in-part of our copending application Serial No. 176,455, filed February 12, 1962. The word filament is used herein, unless the context otherwise indicates, to means any element having a length which is many times greater than any of its cross-sectional dimensions and in particular textile filaments whether in the form of continuous filaments, staple fibres, or otherwise.

The broad object of the invention is to achieve new and improved effects in assemblies of filaments.

A more particular object of the invention is to achieve new or improved effects in assemblies of textile filaments such as tows, slivers, yarns and fabrics.

It is especially the object of the invention to produce from man-made filaments yarns which resemble closely in many of their physical characteristics, such as appearance and handle, and also in their processing characteristics, yarns made from natural materials such as wool.

Further objects of the invention are to provide suitable processes and apparatus for carrying out the foregoing objects.

The manner in which these and other objects not specifically mentioned hereinbefore are achieved will now be described.

According to the present invention a continuous process of simultaneously treating a plurality of filaments forming or capable of forming an assembly of filamentous material comprises the step of variably modifying the filaments so as to retain therein the modification pending a further treatment, the modification being such that the filaments will be capable of a correspondingly variable reaction to said further treatment when uniformly applied to said filaments. The invention also extends to the products of such a process and to machines and apparatus for putting same into practice.

The invention will now be described more specifically with reference to the accompanying drawings in which:

FIG. 1 is a diagrammatic representation of apparatus for converting a continuous filament tow into yarn according to the invention;

FIG. 2 is a diagrammatic representation of another apparatus for converting a continuous filament tow into yarn according to the invention;

FIG. 3 is a diagrammatic representation of yet another apparatus for converting a continuous filament tow into yarn according to the invention;

FIG. 4 is a diagrammatic representation of apparatus for producing continuous filament yarn according to the invention, especially adjacent the spinneret;

FIG. 5 is a diagrammatic representation of another form of apparatus for producing continuous filament yarn according to the invention especially adjacent the spinneret;

FIG. 16 is a diagrammatic elevation of the conventional high bulk yarn of FIG. 14; and FIG. 17 is a view similar to FIG. 16 of a typical yarn produced according to the present invention.

Figure 6:
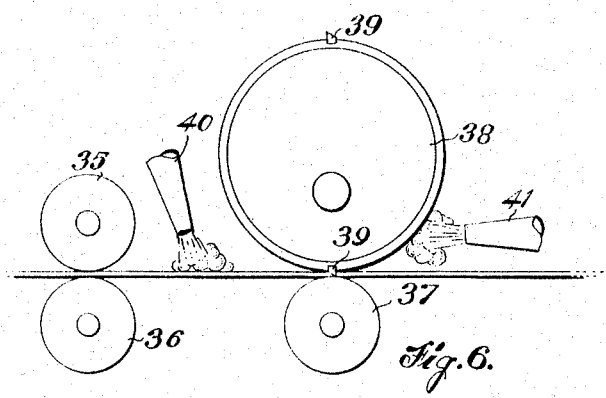
FIG. 6 is a diagrammatic representation of apparatus for producing staple fibre from continuous filament tow according to the invention.

In one method of processing a continuous filament tow of high shrinkage characteristics according to the invention the tow is passed continuously through a heated zone. Before entering the heated zone the tow is suitably tensioned, and means are provided to enable the tension in the tow to be controlled within the heating zone and until it is cooled. For example, a set of feed rollers may be disposed prior to the heated zone and a set of take-up rollers after the cooling zone, the speed of one or both sets of rollers being variable. In one such embodiment the rollers are cylindrical and continuous cyclical changes in the speed of rotation of the take-up rollers relative to the feed rollers are employed to achieve a continuously varying shrinkage of the tow along its length. In another such embodiment conical rollers are used, and the position of the tow on the periphery thereof is used to vary the shrinkage which takes place in the heated zone. When using conical rollers and by causing the tow filaments to be dispersed over the roller peripheries, varying shrinkage characteristics may be introduced transversely of the tow instead of, or in addition to, longitudinal such variations. Clearly the nature and extent of the variations can be controlled as desired within wide limits, and they will be chosen so that when the resultant continuous tow is cut into staple, fibres will exist which have the desired different shrinkage characteristics. The conversion of the tow into yarn may take place in any suitable way, such as, for example on a Pacific or Rieter tow-to-top converter, or by cutting into staple and carding in either case, followed by conventional drawing and spinning operations. It is important that the conversion should be carried out in a way which ensures thorough mixing of the staple fibres and which does not destroy the differential shrinkage characteristics which have been given to the fibres. Finally the yarn is heat-treated at a suitably elevated temperature to cause the fibres to shrink differentially, whereupon the yarn structure is modified, owing to the interaction of the fibres as the differential shrinkage takes place.

There appears in FIG. 1 a diagrammatic illustration of one embodiment of apparatus for carrying out the method of this invention which apparatus is particularly adapted for processing commercially available polyacrylic tow. According to this embodiment, the tow is passed from any convenient source through two pairs of spaced-apart feed rollers 11 and 12, respectively, arranged on either side of a steam chamber adapted for the passage of the tow therethrough. The roller pairs are driven by means of the respective motors 13, 14 which are adapted to have the speed thereof altered over a considerable range by an appropriate control. A fan 15 is provided between the outlet of the steam chamber and the second roller pair 12 to direct a cold blast of air against the tow. The purpose of the air blast from fan 15 is to impart to the tow emerging from the steam chamber more rapid cooling than would exist in the ambient atmosphere alone so that the tow has achieved a more stable condition before encountering roller pair 12. After leaving roller pair 12, the tow is advanced to machinery capable of converting the same into staple fibres and ultimately into spun yarn. Such machinery is of types conventionally employed in the art and may include, as appears in FIG. 1, a staple cutting machine, a card, one or more draw frames, a roving frame, and finally, a spinning frame. The staple cutting machine is preferably of the type that can be adjusted to produce staple the length of which varies within narrow limits or is a chosen constant length.

The distance separating the roller pairs and hence the length of the heating zone as defined by the steam chamber and the cooling zone should preferably be relatively small compared with the length of the tow over which a complete cycle of variations occurs. It is advantageous from the standpoint of flexibility of operation for the steam chamber to be designed for operation under pressure or not, as desired, as well as for varying the temperature of the steam supplied thereto. The following examples illustrate the operation of the apparatus of FIG. 1:

*Example 1*

This example describes processing of a 500,000 denier, 5 denier per filament, commercially available polyacrylic tow made from a co-polymer which is 94% acrylonitrile and 6% vinyl acetate ("Acrilan") on the apparatus of FIG. 1 to produce a wool-like yarn according to the invention. The tow has initially a substantially uniform shrinkage characteristic of 20%, in saturated steam at 212° F.

The relaxing ratio of the roller pairs is caused to vary continuously by adjustment of one or both of roller driving motors from 1 to 0.82 whilst processing eighteen feet of tow, then from 0.82 to 1 whilst processing a further eighteen feet of tow and so on. The distance between the roller pairs is much less than eighteen feet, say about three feet. The temperature of the steam chamber is approximately 212° F. and the pressure atmospheric. The length of the steam chamber is approximately one foot and the linear speed of the tow is thirty feet per minute. After emerging from the steam chamber and before passing between the rollers of pair 12 the tow is caused to pass below the fan which blows a current of cold air over it to promote more rapid cooling to a temperature at which it is stable. From the roller pair 12 the tow is passed to the cutting machine by which it is converted to staple varying in length from five to seven inches. The staple thus produced varies in its shrinkage characteristics in saturated steam at 212° F. over the whole range of 0% to approximately 18%, and the distribution of the fibres with different shrinkage characteristics is uniform over the range. Likewise the distribution of fibres of different staple length is uniform over the range of staple lengths. Within each staple fibre there will be a continuous variation of shrinkage characteristic from end to end, but this variation will be very small amounting to no more than a difference of about ½%. The staple is then passed through a line of conventional long staple flax type spinning machinery comprising card, draw frame, roving frame and spinning frame. The final yarn produced is 24s worsted count, eight turns per inch.

The yarn is made into hanks and heat-treated in saturated steam at 212° F. for a period of twenty minutes to develop its shrinkage characteristics which results in a yarn which resembles in its essential physical characteristics a woollen yarn. In handle and appearance it corresponds closely to a woollen yarn. Its processing characteristics and in particular its load-elongation and recovery characteristics also correspond closely to those of a woollen yarn. The yarn is therefore satisfactory for weaving and knitting into excellent fabrics, combining many of the more desirable qualities of both wool and polyacrylics, and which have, in particular, very good dimensional stability and crease resistance.

*Example 2*

In this case two ends of the singles yarn described in Example 1 are plied before or after the final heat-treatment described in the previous example. In either case the result is a yarn which is satisfactory for weaving and knitting into excellent fabric, for example machine knitted outerwear of the fashion type for which wool and conventional high bulk yarns are presently used, and having the same qualities as the fabrics of Example 1.

Some differences of appearance of the yarns may arise (reflected to a lesser extent in the appearance of fabrics made therefrom), depending on whether development of its varying shrinkage characteristics is carried out before or after plying.

It will be clear that in a process involving treating the tow as in the foregoing examples the substantially uniform shrinkage properties of the tow as originally produced are modified in a variable manner so that by a subsequent treatment uniformly applied the staple fibre produced from the tow may be caused to shrink differentially. It is therefore important that the processing conditions employed should not be such as would destroy the ability of the filaments to shrink. Thus when processing a high shrinkage polyacrylic filament tow the use of temperatures which are too high or processing times which are too long or both might render the differential shrinkage referred to impossible and must therefore be avoided.

If heating of a polyacrylic filament tow is in the presence of moisture, the temperature should ordinarily be above 185° F., whilst if carried out in dry air the temperature ordinarily should be above 260° F. Preferably saturated steam at approximately 212° F. is used. The time of passage through the zone should not be too short. When using such steam treatment the time of passage through the treatment zone should not be more than six seconds and it is preferred to reduce this time to one second if possible.

A wide variety of results may be obtained when processing filaments on apparatus such as that illustrated in FIG. 1 by adjusting certain variables, the most important of which are the actual range of shrinkage characteristics induced in the filaments; the manner in which the shrinkage characteristics vary within that range; the length of the filaments over which the shrinkage characteristics vary; and the relationship of the staple length or lengths of fibres cut from the filaments to the foregoing. Further examples will now be given.

*Example 3*

A tow similar to that of Example 1 is processed on the apparatus of FIG. 1 in such manner that the distribution of the variable shrinkage characteristic throughout the mass of subsequently cut staple fibre is uniform. The staple length is arranged to be constant at six inches, and there is negligible variation of the shrinkage characteristic within the individual fibres.

The staple fibre cut from the tow is processed on long staple flax machinery which gives thorough mixing and a yarn of 16s lea 5 turns per inch is produced. From the yarn is produced a 4-ply 3 turns per inch yarn which is fully developed by heating to cause shrinkage in the same way as the yarn in Example 1.

The final yarn has an extension to break of 25% and a fibre packing factor of 0.27. The instrument used for establishing the extension to break is the Uster single thread strength-testing machine and the instrument used for establishing the fibre packing factor is the Bocking Geometer (described in the Journal of Textile Institute, vol. 50, No. 12, of December 1959, pages T655 et seq. which is published in Great Britain for the Textile Institute, 10 Blackfriars Street, Manchester 3, England, by McCorquodale & Co., Ltd., Newton-lee-Willows, Lancastershire, England).

The yarn is very similar in appearance, handle and workability to certain woollen yarns suitable for the hand knitting of outerwear. It is to be particularly noted that the load-extension and recovery characteristics of the yarn are very similar to those of woollen yarn of corresponding bulk and therefore the yarn is very suitable for hand or machine knitting, unlike conventional high bulk yarn usually made from mixtures of two distinct types of staple, one with a given non-varying shrinkage characteristic and one with a different non-varying shrinkage characteristic. Such high bulk yarn has considerably less "give" than woollen yarn and for this reason is not as easy to knit.

Fabrics knitted from the yarn of Example 3 have all the desirable properties associated with yarns made from fibres, such as polyacrylic fibres, which have low water imbibition and a high natural ability to recover from deformation, and which therefore have what are usually referred to as "easy-care" qualities, e.g., ease of laundering and drying without the necessity of ironing. In addition the fabric is more resilient than similar garments produced for example from high bulk yarn and show great dimensional stability in washing. Furthermore the yarn when made up into fabric gives a well-defined clarity of stitch in the knitted fabric compared, for example, with similar fabric made from conventional high bulk yarn made from similar fibres. Furthermore the fabric made from the yarn is more resistant to pilling and scuffing than fabric made from conventional high bulk yarn.

Example 4

Again a tow similar to that used in Example 1 is processed on the apparatus shown in FIG. 1. The variables are adjusted so that the distribution of the variable shrinkage characteristic is not uniform. There is a substantially uniform distribution of fibres having from 0–5% shrinkage but these form 20% of the total. There is likewise a substantially uniform distribution among the remaining fibres having shrinkage characteristics from 5–20%. It is also arranged that the fibre length varies from five to seven inches and the distribution of the fibres of different staple lengths is uniform throughout the mass. Within each individual fibre there is negligible variation of shrinkage characteristic.

24s worsted 8 turns per inch yarn is produced from the staple cut from the tow in the same manner as in Example 3 which is then made 2-ply 5 turns per inch and fully developed in the manner described in Example 1.

The final yarn has an extension to break of 25% and a fibre packing factor of 0.24.

The yarn is much softer in handle than wool and in this respect resembles conventional high bulk yarn of similar fibre packing factor. Its load-extension and recovery characteristics, however, are similar to those of a woollen yarn of corresponding bulk. Its other qualities are similar to those described in Example 3 although there is a less well-defined clarity of stitch.

Example 5

In this example a carpet yarn is produced from a 15 denier per filament high shrinkage polyacrylic tow.

The tow is processed on the apparatus shown in FIG. 1 with the variables adjusted to give uniform distribution of variable shrinkage characteristic within the range 0–10%; a uniform staple length of six inches; and substantially no variation of the shrinkage characteristic within individual fibres.

The staple fibre cut from the tow is crimped in a stuffing box and then spun on the standard long staple machine carpet system to 8s cotton count 3 turns per inch and then folded 3-ply 1½ turns per inch.

Shrinkage development is as described in Example 1.

The resultant yarn is of higher bulk than conventional carpet yarn made from synthetic fibres, but has a lower initial modulus which makes it easier to process on the tufting machine. When tufted into carpet it exhibits high tread resilience and good covering power.

The foregoing examples, it will be noted, refer to the production of polyacrylic yarns for the reason that polyacrylic tow is currently readily available in high shrinkage form and can very conveniently have its shrinkage characteristic modified in accordance with the present invention by the method of differential relaxation employed in the foregoing examples. This particular mode of practising the invention is, however, as will readily be appreciated, applicable to any filament which has a high shrinkage characteristic and which can have this characteristic modified differentially so as to be capable of development by a subsequent treatment. Examples of other filaments are polyamides, such as nylon, polyesters such as polyethylene terephthalate, and polyolefins such as polypropylene.

The diagrammatic illustration of FIG. 2 is of a modified embodiment of apparatus especially adapted for the processing of such other filaments. This modified embodiment is very similar to the embodiment illustrated in FIG. 1 except in two respects. First, the roller pairs 16, 17 respectively, are driven at the same constant speed either by means of constant speed motors (not shown) or by appropriate control of motors similar to motors 13, 14 of FIG. 1. Second, the steam chamber is replaced by a heating member 18 through which hot air is circulated so as to heat a tow passing in proximity thereto to a temperature which can be varied cyclically over a considerable range.

The following example illustrates the practice of the invention on the apparatus of FIG. 2.

Example 6

In this example a polyethylene terephthalate tow of 200,000 denier, 3 denier per filament, is processed in the apparatus of FIG. 2. The material is supplied by the producer so processed during and after hot drawing step that it has a uniform shrinkage characteristic of 18% when subjected to a temperature of 356° F. in the absence of moisture.

The heater 18 is so controlled as to heat the tow passing therethrough to a continuously varying temperature between the limits of 158° F. and 356° F. The temperature is caused to vary in a linear manner from maximum to minimum over eighteen feet of passing tow and back again over a like length of passing tow. The tow so processed in an analogous manner to the tow of Example 1 is converted to six inch staple, and spun into yarn, which is then heat-treated at 356° F. in the absence of moisture to produce a yarn with a structure modified in a similar manner as in Example 1.

In this example it will be noted that a somewhat different method is employed to modify the shrinkage characteristic differentially. The principal reason for this is that polyethylene terephthalate has different processing characteristics to those of, say, polyacrylonitrile.

Difficulties exist in processing polyethylene terephthalate on the apparatus of FIG. 1 since in order to prevent the filaments becoming "set" or "partially set" the processing speeds necessary would give rise to practical problems. Of course setting or partial setting would preclude or considerably diminish the subsequent shrinkage development which is necessary for the satisfactory practising of the present invention. The principles involved are in general the same, however, and the processing variables may be adjusted in an analogous manner to the variables involved in the previous examples, and likewise different end results may be obtained.

Where a viscous rayon tow is to be processed according to the invention, a further modification of the apparatus is preferably employed for this purpose, as is illustrated diagrammatically in FIG. 3. As can be seen in this figure, the tow is passed first through an aqueous bath 19 containing a polymerizable resin-impregnating composition, such as a water-soluble ethylene urea formaldehyde precondensate and a suitable resinifying catalyst, such as magnesium or ammonium chloride, and then through a pair of driven nip rollers 20. The upper roller of the pair 20 is supported for vertical movement and loaded resiliently by means of a spring 21, lever 22 and rotating arm 23. This system is so designed that it operates to effect a variable expression of the bath liquid. For example, it can be arranged to leave the ethylene urea formaldehyde resin on the tow in amount from 2% to 10% of the weight of the tow, the amount varying continuously from the maximum to the minimum and back again over successive eighteen feet lengths of the tow. In practice to obtain such a range of expression a multiple bath system using baths of different concentrations might well be necessary but in the embodiment as illustrated, for simplicity, only one bath is shown.

The tow is then passed through a baking oven 24 maintained at a sufficiently high substantially constant temperature, say within the limits 302° F. to 320° F., to cure the ethylene urea formaldehyde condensate to an insoluble resin.

Next the resin treated tow passes through a bath 25 of warm water and then through a bath 26 containing a solution of an appropriate fibre finish (to aid spinning) dispersed in cold water. Appropriate fibre finishes for this purpose include sulfated oils and fats, mineral oil emulsions, alkyl quaternaries, and waxes. From this bath the tow passes through a hot air drier 27. After being dried the tow is processed on spinning machinery similar to that already described with reference to FIG. 1, and finally the yarn thus produced immersed in aqueous caustic soda solution or like shrinking agent. By this means the yarn fibres are caused to shrink by a varying amount, the shrinkage being less in the parts of the fibres carrying more resin, so as to give rise to a similarly modified structure to the yarn described in Example 1. At some convenient later stage it may be necessary to process the yarn or fabric made therefrom so that all the fibres are cross linked or stabilized to substantially the same degree, for example by the application of a crease-resist resin. Otherwise, there may be a tendency during later processing and use, particularly washing, for the special characteristics of the yarn to be lost.

It is to be noted that although the process of this example depends on variable expression of the resin treating bath liquid, the latter may be alternatively, or additionally (as stated), caused to vary in resin concentration as the tow passes therethrough.

The foregoing examples all refer to the modification of the shrinkage characteristic of textile filaments and are examples of a very important aspect of the present invention. These particular processes are applicable to all filaments which can be put into a condition where they can be shrunk differentially. In general all wholly synthetic thermoplastic filaments can be so treated along with many other man-made filaments. Specific methods and apparatus have been described in the foregoing examples, but the particular method and apparatus chosen will depend on the particular characteristics of the material from which the filaments are made. Thus as has been shown in the foregoing examples it is preferred to process polyacrylic filaments in one particular manner, polyethylene terephthalate filaments in another manner, and viscose filaments in still another manner. Polyamide filaments can be processed according to the present invention in a similar manner to polyethylene terephthalate filaments. Generally speaking polyamide filaments are currently available, however, with a total shrinkage characteristic of about 10% which would limit the range of end results obtainable. However, polyamide filaments with a higher total shrinkage characteristic can be produced thus enabling the range of end results to be extended. Furthermore polyamide filaments can be given variable shrinkage characteristics by chemical processing in which a chemical, causing fibre shrinkage, is applied differentially to the filaments, subsequent development being by uniform application of the chemical to the filaments. An example of such a chemical is phenol in aqueous solution of a concentration less than 4½%. Furthermore although the foregoing examples relate to high shrinkage tows similar principles are applicable to fully relaxed tows in which case differential shrinkage could be induced by differential stretching, and without it being necessary to use heat, although heating can be employed if desired.

The foregoing examples are also all directed to the production of yarns from taple fibre in accordance with the present invention and further examples will now be given also relating to production of yarn from staple fibre, but illustrating that it is not necessary for all the staple fibre which is used to have been produced according to the present invention, or if so produced to be of the same type.

*Example 7*

In this example 5 denier per filament high shrinkage polyacrylic tow is processed on the apparatus of FIG. 1. The distribution of the variable fibre shrinkage characteristic is uniform and the range from 0–10%. The staple length is uniform at 6 inches and there is substantially no variation of shrinkage characteristic within individual fibres. The staple fibre cut from the tow is carded and the slivers produced are blended 50:50 with slivers of 56s quality wool combed top on the conventional worsted system and spun to 15s worsted count yarn. The yarn exhibits fairly even distribution of the different fibres with perhaps a tendency for the wool to predominate at the outside.

The final yarn has an extension to break of 22% and a handle similar to that of yarn made from wool. The yarn is not subject to shrinkage or other conditions to develop its varying shrinkage characteristics but woven into fabric having 35 ends per inch and 35 picks per inch. This fabric is developed by immersing in water at approximately 212° F. in a tensionless condition. Care is exercised not to allow the fabric to crease before it is cooled. The fabric thus developed has approximately 39 ends per inch and approximately 39 picks per inch. It has a warp and weft crease recovery value of 150° by the "British Standard Method of Tests for The Recovery of Fabrics From Creasing," BS 3086; 1959, published by British Standards Institute, British Standards House, 2 Park Street, London W1, and printed by Baynard Press, London S.W. 9. The fabric is very similar to a corresponding woollen fabric, has "easy-care" qualities and is suitable for skirts and suitings. It is particularly stable dimensionally.

*Example 8*

In this example staple fibre produced from 3 denier per filament high shrinkage polyacrylic tow having a shrinkage characteristic of 10% and a 6 denier per filament high shrinkage polyacrylic tow having a shrinkage characteristic of about 18% were both processed separately in the apparatus of FIG. 1. The apparatus was operated in such manner that the staple produced from the 3 denier per filament tow had a uniform distribution of fibre shrinkage characteristic within the range 0–10% and a uniform staple length of 6 inches whereas the staple fibre produced by the apparatus from the 6 denier per filament tow had a uniform distribution of fibre shrinkage characteristic within the range of 10–18% and a uniform staple length of 6 inches. In both cases there was a negligible variation of the shrinkage characteristic within the individual fibres. The two component staple fibres were blended together in the proportions 60% (0–10% shrinkage fibre), 40% (10–18% shrinkage fibre) and the resultant blend spun on the flax system to 45s lea 10 turns per inch singles. This was then used to produce 2-ply 6 turns per inch yarn.

The final yarn was developed in the same manner as in Example 1 and woven into a plain fabric with 25 picks per inch and 25 ends per inch.

The yarn after development had an extension to break of 26% and a handle similar to that of yarn made from wool. The yarn was of open structure throughout, the inner portion consisting predominantly of the 6 denier fibres and the remainder consisting predominantly of 3 denier fibres. The fabric had a crease recovery value of 156° (weft) and 154° (warp) by the Monsanto or Shirley test. A soft handle was also evident.

There are several known methods of producing continuous multifilament bulked yarns, for example, those methods based on false-twisting the filaments, passing the filaments over a heated sharp edge, subjecting the filaments to an air blast, and passing the filaments through a stuffer-box. All such methods, however, involve additional processing of the yarn as supplied by the producer—that is to say, by throwing operations.

In the embodiments of apparatus thus far described, all of the strands in the given tow assembly are processed in like manner, the variations created therein varying uniformly across the entire assembly. It is within the scope of the present invention, however, to produce variations which differ or are nonuniform in corresponding regions of the filaments making up the assembly. One embodiment of apparatus for producing this effect is illustrated diagrammatically in FIG. 4 of the accompanying drawings. Such apparatus is disposed so that a plurality of continuous filaments as produced in the known manner from a spinneret and its associated drawing system can be passed continuously in the absence of twist therethrough. Of course the method could be applied as an additional process at some later time if desired.

In the apparatus of FIG. 4, a continuous sheet 30 of synthetic filaments having a relatively low uniform shrinkage characteristic say, of less than 10% for polyacrylic filaments, and thus capable of being further drawn to a substantial degree are passed side-by-side through a drawing system which includes two spaced pairs 28, 29 of conical rollers. Both the rollers of the first pair 28 have their smaller ends in juxtaposition at one edge of the sheet of filaments 30, whilst both the rollers of the second pair 29 have their smaller ends at the other edge of the sheet of filaments 30. Both pairs of rollers 28, 29 are driven at like peripheral speeds and are linked by a mechanism 31 which repeatedly causes the rollers of each pair 28, 29 to separate in turn. Thus, the filaments will be successively and repeatedly under the drawing influence of first one pair of rollers 28 and then the other pair 29. When under the influence of the one pair 28, the filament at the smaller ends of the rollers will be stretched a minimum amount whilst the filament at the larger ends of the rollers will be stretched a maximum amount. The filaments inbetween will be stretched to varying degrees between the two extremes. When under the influence of the other pair the effect will be reversed, since the filament previously subjected to minimum stretch will now be subjected to maximum stretch and vice versa. The roller pairs are similarly dimensioned and the sheet of filaments extends over like parts thereof, and so the filaments at or near the centre of the sheet will always be stretched by substantially the same amount. It will usually be necessary to provide a compensating system 32 associated with the roller pairs 28, 29 because the filaments will, from time to time, have different linear speeds. The system 32 will include a movable roller, under which the filaments pass, which is adjusted in position continuously to deflect the filaments in such a manner that a substantially constant tension is preserved in each.

After passing through the drawing system all, or nearly all, the filaments will have been stretched by varying amounts along their length, depending on the speed of the conical rollers and the frequency of the change over from one pair to the other, the effect being variable also across the sheet of filaments.

The filaments are subsequently twisted to form a yarn and then shrunk by uniform heat-treatment. Since the amount of shrinkage at any given part of a filament at a given temperature depends on the amount that part of the filament has previously been stretched, the shrinkage will differ along the length of each filament and also transversely of the yarn, the result being that, in any short length of the yarn the filaments which shrink least are caused by the other filaments to loop and spread, which gives the yarn as a whole increased bulk without high stretch at low loads. The effect may, if desired, be further varied by changing the twist in the yarn.

The general technique utilized in connection with the apparatus of FIG. 4 can be readily adapted to the needs of filaments which by their nature exhibit a better response to a heat treatment than to a stretching operation, such as those formed of polyethylene terephthalate polymer, by substituting for the variable stretching means of FIG. 4, a means for applying to the filaments a variable heat treatment.

Thus, as shown in FIG. 5, the filaments in this case are processed in a manner analogous to that used in the embodiment of FIG. 4 except that, instead of conical rollers, two hot air heaters 33, 34 are used through which the filaments are passed at a constant speed by feed and withdrawal roller systems (not shown). Their heating effect is arranged to vary across the sheet of filaments. The first heater 33 when in operation causes the filaments at one edge of the sheet to be heated to a relatively high temperature at which the filaments exhibit maximum shrinkage and the filaments at the other end of the sheet to relatively low a temperature at which no shrinkage occurs with a selected temperature gradient therebetween. The other heater is arranged to have a reverse effect. As in the case of the rollers of the previous example the heaters are brought alternately into operation. The result of this is that the filaments are given markedly differential shrinkage characteristics in like manner to that appearing in filaments processed in the apparatus of FIG. 4. The following example illustrates the operation of the embodiment of FIG. 5.

*Example 9*

Filaments of polyethylene terephthalate which are produced with a uniform shrinkage characteristic of 20% at 356° F. in the absence of moisture are processed in the absence of twist in the apparatus of FIG. 5, the heating action of the first heater 33 being such as to heat the filaments at one edge of the sheet to a temperature of 356° F. and the filaments at the other end of the sheet to a temperature of 122° F., with the filaments between the two edges varying uniformly between these extremes. The temperature gradient of the second heater 34 is made to be precisely opposite from that of the first heater 33. The heater temperature and yarn rate of travel therethrough are regulated in such a manner that a variable shrinkage characteristic of from 0% to 18% is induced. When twisted and subjected to a suitable further constant temperature heat treatment the yarn bulks as the differential shrinkage takes place.

If desired, the treatment effective to impart to the filaments the variable shrinkage characteristics can be carried out in conjunction with the staple cutting step of the over-all process instead of in a separate preliminary step as has been the case in the embodiments thus far described. One form of apparatus in which the variable shrinkage treatment and the staple-cutting steps are carried out concurrently is illustrated in FIG. 6.

As shown in this figure the tow is fed by means of a pair of nip rollers 35, 36 rotating at constant speed to another pair of rollers of special design whereby the tow is reduced to staple. The lower roller 37 of the second pair is of rubber and is cylindrical and concentrically mounted. The upper driven roller 38 which is surfaced with rubber carries cutters 39 at spaced intervals around its periphery and is eccentrically mounted, its bearings being arranged to reciprocate along the line of centres of the two rollers. Means 40 for directing a steam jet on the tow as it enters the nip between the rollers of the second pair is provided. It is important that the filaments are cooled before they emerge from the nip of the second pair of rollers and the point of application of the steam jet is chosen accordingly and special cooling means, such as means 41 for projecting a jet of cooling air on roller 38, provided if necessary. The speed of rotation of the second pair of rollers, the spacing and position of the cutters and the eccentricity of the top roller are so chosen that staple of appropriate length is cut from the tow, each fibre, due to the continuously varying peripheral speed of the top roller, resulting from its eccentricity, having been relaxed in a continuous variable manner, say from 0% to 20% from end to end.

*Example 10*

Yarn is spun from the staple prepared by processing a high shrinkage tow of polyacrylic filaments on the apparatus of FIG. 6 at the relaxation range of 0–20 percent and when appropriately heat-treated exhibits a structure which varies from very open at the outside to quite compact at the core.

Clearly the nature of the variation in the fibres may be controlled in many different ways and different end results thereby obtained.

Figure 7:
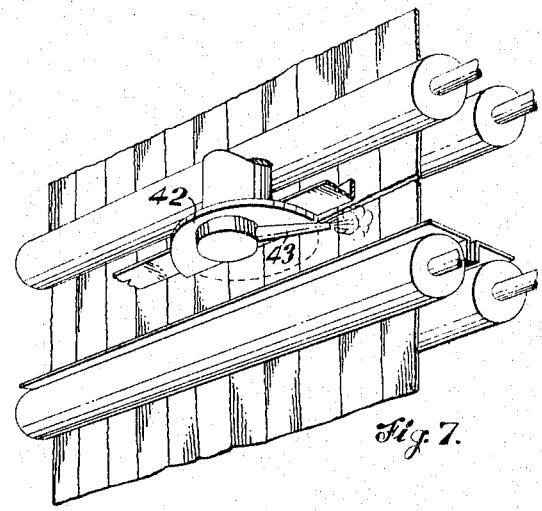
FIG. 7 is a diagrammatic representation of apparatus for producing staple fibre from continuous filament tow according to the invention.

Concurrent reduction of the tow into staple and introduction of the variable shrinkage characteristic to the filaments thereof can also be accomplished with a different type of known staple cutting machine, according to which a cutting blade is passed transversely across a moving sheet of filaments. Once such apparatus embodying the present concept is diagrammatically illustrated in FIG. 7. According to the apparatus of FIG. 7, a suitable high shrinkage tow, for example, of polyacrylic filaments is cut into stable by a cutter 42 of the Nordholm or Braidwater type carrying a steam nozzle 43 at a given distance behind the cutter blade. The details of the mounting and operation of the cutter 42 and associated steam nozzle 43 have not been shown since they are either well-known in the art or obvious to a person skilled in the art. In this way a part of each fibre is automatically steam relaxed so as almost completely to inhibit any further heat shrinkage thereof. In this case the variation of the shrinkage characteristic is substantially discontinuous, and when the staple is spun into yarn, and the yarn subsequently subjected to an appropriate heat-treatment the latter exhibits a more sharply defined transition from a compact core to an open-structured surface.

Discontinuous variations in the shrinkage characteristics of a group of continuous filaments may be obtained by similar means but without cutting.

When producing staple fibres according to the invention the effect of subsequent processing steps should be taken into consideration. For example, it is often desirable, if producing silver using a card other than a flax card, to have crimp in the fibres. The step of imparting the crimp after the fibres have been subjected to variable modification, may, and often does, cause the temperature of the fibres to be elevated, and such elevated temperatures will in certain cases modify the variable characteristics produced by the processing according to the invention. This will be so, for example, where the characteristic is shrinkage on subsequent heat-treatment if the temperature reached in crimping is sufficiently high. It is, however, fortunately, a simple matter to compensate for this by introducing a correspondingly greater variability in the first place, so that the desired end result is still achieved. The alternative would be to choose a crimping method where a rise in temperature does not occur, or is so small as not substantially to effect the variability of the characteristic.

As has been stated the foregoing examples all relate to the treatment of textile filaments and involve the modification of the shrinkage characteristics thereof. It will be clear that the possibilities of variation on this theme are numerous and the same would apply where the property was some property other than the shrinkage characteristic. In order to illustrate these possibilities it will be convenient to analyse fully the application of the invention by way of example to textile filaments and utilising the ability of certain such filaments to have their shrinkage characteristic modified in a variable manner. Thus, according to the present invention, the following may be produced:

(I) A group of continuous filaments each filament having a like varying longitudinal shrinkage characteristic. This is achieved for example by providing pairs of cylindrical rollers before and after a heated zone, between which tow passes, and continuously varying their relative speed, as in Example 1, before cutting takes place.

Figure 8:
FIG. 8 is a diagrammatic representation of a filament assembly according to the invention wherein a plurality of filaments are given a longitudinal variation in a characteristic thereof, for instance shrinkage, the periodicity of the variation being the same for all filaments in the assembly and the variation being in phase for all filaments in the assembly.

FIG. 8 illustrates such a group of continuous filaments and the variation of the shrinkage characteristic is shown in this figure by the thickness of the line representing each individual filament. It is to be stressed that this is merely a convention and is not intended to indicate the specific variation in the cross-sectional dimension of the filament.

It is also pointed out that in this figure and in FIGURES 9 to 12 such filaments have been shown for the purposes of illustration and not limitation. In practice there would of course usually be a far greater number than this.

When the material of this group is in the form of a tow it will normally be used for producing staple fibre and in this connection reference should be made to group IV hereunder.

When the material of group I is in the form of a continuous filament yarn it can be utilised in accordance with the present invention in a number of different ways. For example it could be combined with a natural yarn and then a subsequent development treatment employed to produce, say, a fancy yarn.

It may be used in a fabric either alone or with other yarns. Thus for example if woven alone in a suitable pattern into a fabric and then developed a seersucker effect would be obtained. Yet another way of utilising such a yarn would be to cause the filaments to be displaced longitudinally relative to one another say by twist or air blast or by causing them to traverse a varying path length, before development whereafter a bulking effect is achieved.

(II) A group of continuous filaments each (or many) having a different but unvarying longitudinal shrinkage characteristic. This may be, for instance, achieved by producing a pair of cylindrical nip rollers before a heated zone, and a pair of conical nip rollers after the heated zone, the speeds of the two pairs being fixed and passing tow through the system.

Figure 9:
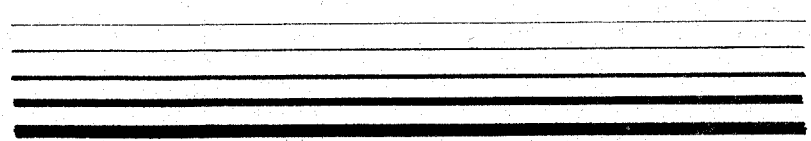
FIG. 9 is a view similar to FIG. 8 except that the characteristic within each filament is maintained constant, the variation thereof being between filaments in the assembly.

FIG. 9 illustrates filaments of this group the differential shrinkage characteristic being illustrated by use of the same convention adopted in FIG. 8.

In the form of tows filaments of this group may be reduced according to the present invention to staple fibre (see group IV hereunder).

In the form of continuous filament yarn interesting possibilities exist. It is difficult to envisage a commercial method of producing such yarn which will not involve an output in which the length of the individual filaments produced per unit time does not vary. One method of compensating for such a variable output would be to twist the yarn appropriately whereby to produce a yarn with successive compact nodes with a more open structure between the nodes. Although on developing such a yarn the bulk would be reduced, such yarns are useful in producing a woven fabric of very even structure. In this case the fabric would be woven from the yarn before development and the development treatment applied to the finished fabric. In this way the initial bulk of the yarn would govern the spacing of the ends and picks and when the bulk was reduced or removed by the development treatment a fabric of very even structure would result.

(III) A group of continuous filaments each (or many) having a different and varying longitudinal shrinkage characteristic. This is achieved, for example, by providing a pair of cylindrical rollers before the heated zone and a pair of conical rollers after the heated zone and varying their relative speed.

Figure 10:
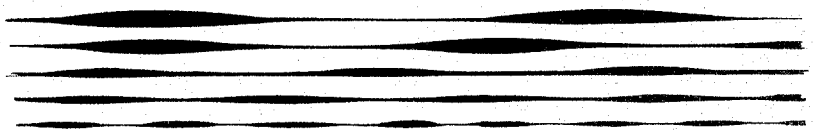
FIG. 10 is another view similar to FIG. 8 except that the periodicity of the variation changes from filament to filament.

FIG. 10 illustrates such a group of filaments using the same convention as before.

Continuous filament tows, like those of the previous groups, could be used to produce staple fibre from which yarns would be spun and in this connection reference should be made to group IV hereunder.

Figure 11:
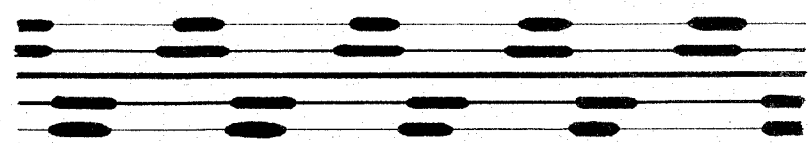
FIG. 11 is an additional view similar to FIG. 8 except than an intermediate filament has its characteristic altered in constant fashion, while that of the filaments on either side thereof is periodically modified and in staggered relationship.
Figure 12:
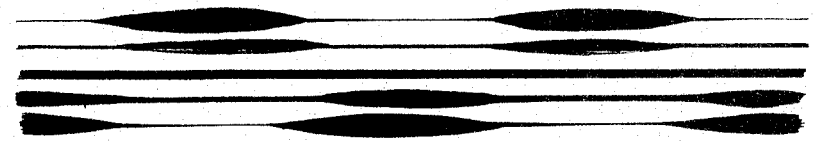
FIG. 12 is a view similar to FIG. 11, except that the periodicity of the variation is considerably lengthened and the variations are less abrupt.

In the form of continuous filament yarn there are a wide range of possibilities and the continuous filament yarns of groups I and II might be considered as being special limiting cases in this range. It is to be noted that there is again the problem, as with continuous filament yarns of group II, of the variable output. In order to avoid the problem of variable output the filaments may be processed, for example, in the manner illustrated in FIG. 4, and FIG. 11 illustrates the manner in which the shrinkage characteristic varies in a group of filaments so treated. The discontinuities longitudinally of each filament will be noted but there is of course a continuous variation of shrinkage characteristic transversely of the yarn. Furthermore, the discontinuities would be displaced by twist and no unevenness along the length of the yarn would occur on development. FIG. 12 illustrates a group of filaments produced as illustrated in FIG. 5. In this case the longitudinal discontinuities are not so pronounced.

(IV) A group of staple fibres including a number of types having different shrinkage characteristics. This may be achieved by converting any one or more of the groups of continuous filaments of I, II and III above into staple. The number of different types depends on the group or groups used and the number of filaments in it. The variation of shrinkage characteristics along the length of each fibre may be arranged to be substantially none up to a high variation according to the relationship between staple length and the processing conditions chosen.

Many of the specific examples given heretofore illustrate such groups of staple fibres and their usefulness.

(V) A group of staple fibres each fibre having like variable longitudinal shrinkage characteristics. This may be achieved by producing a group of continuous filaments of group I, and suitably synchronising the cutting of the staple with the variable processing conditions, by using an eccentric cutter as in the embodiment of FIG. 6 (the variation being continuous) or by using a Nordholm or Braidwater cutter in the manner described in the embodiment of FIG. 7 (the variation being substantially discontinuous).

As has been indicated yarn produced from group IV staple fibres are of considerable interest and importance and when describing yarns produced from such staple fibres in the foregoing examples reference has been made for comparison purposes to conventional high bulk yarn produced from synthetic staple fibre. In order to aid a fuller understanding of the invention the structure of various yarns both conventional and according to the present invention will now be described.

Figure 13:
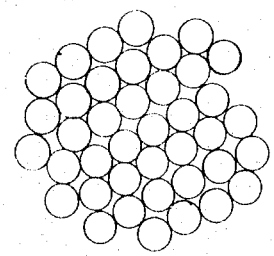
FIG. 13 is an enlarged cross-sectional diagram of a conventional unbulked yarn from the prior art.

FIG. 13 is intended to illustrate a cross section taken through a conventional unbulked yarn made from synthetic staple fibre all of a given shrinkage characteristic.

Figure 14:
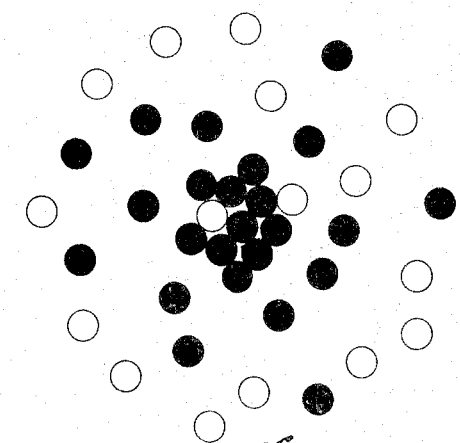
FIG. 14 is a view similar to FIG. 13 of a conventional high bulk yarn of the prior art.

FIG. 14 illustrates to substantially the same scale a cross section through a conventional high bulk yarn made from synthetic staple fibre of two different shrinkage characteristics. The dark circles represent fibres with the higher shrinkage characteristic and the light circles the fibres with the lower shrinkage characteristic. The preponderance of fibres with the higher shrinkage characteristic at the core of the yarn is due to the tendency of these fibres to loop in and out of the core over relatively long distances, that is to say a substantial length of each fibre tends to remain in the core. The fibres having the lower shrinkage characteristic, on the other hand, tend to loop in and out of the core rapidly so that a relatively short portion thereof remains in the core.

FIG. 16 is a diagrammatic elevation to a large scale of a yarn of this type, but for clarity the number of fibres at any cross-section is ten compared with forty in FIG. 14. Furthermore, no fibre ends are shown in the short element illustrated.

Figure 15:
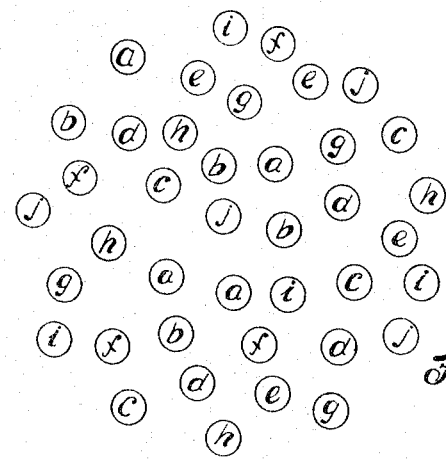
FIG. 15 is a view similar to FIGS. 13 and 14 of a typical yarn formed according to the invention.

FIG. 15 is a cross section through a yarn spun from synthetic staple fibres produced according to the invention the fibres having substantially a continuum of different shrinkage characteristics. In this case the different shrinkage characteristics are illustrated by different letters of the alphabet. The yarn of Example 1 would be a yarn of this type, and it is assumed that there is negligible variation of shrinkage characteristic longitudinally of each fibre.

FIG. 17 is a diagrammatic elevation to a large scale of a yarn of this type, but, again, for clarity the number of fibres at any cross section is only ten, and no fibre ends are shown.

A yarn which may loosely be described as somewhere between a conventional high bulk yarn and the yarn illustrated in FIG. 15 may be produced by utilising staple fibre falling within group V and having a continuous variation along each fibre. The tendency of such a yarn will be to have a greater compactness at the core than that illustrated in FIG. 15. This tendency may be exaggerated by utilising staple fibre of group V with discontinuous rather than continuous variation in the shrinkage characteristic and whilst in appaarence, handle and tensile properties such a yarn would be very similar to a conventional high bulk yarn, it differs from such yarn in that instead of looping in and out of the core there is a tendency for all the fibres to become anchored at one end in the core and usually with the other end at or near the surface of the yarn. Such a yarn is particuarly useful for the manufacture of blankets and other types of brushed fabrics since the brushing is facilitated and there is less shedding of fibres.

Although the majority of the foregoing examples have been concerned with the production of what may be described as bulked yarns from wholly synthetic thermoplastic filamentous material, and involve the step of causing such material to have variable shrinkage characteristics, it is to be understood that the invention is by no means limited to such procedure. Thus, textile filaments may be treated in accordance with the invention so that they are given a differential affinity for a dyestuff. One method of achieving this would be to treat the filament surface with a suitable resin in a variable manner whereupon on subsequently having applied thereto a suitable uniform dyeing process a corresponding variable uptake of dye will occur, the resin being removed during or after dyeing if necessary or desirable. One of the main applications of such embodiments is to enable man-made filaments to dye in a similar manner to natural fibres. For example wool fibres have differential dyeing properties whereas man-made fibres tend to have much more uniform such properties. As a consequence tartans, for instance of man-made materials, never seem to have the appearance of woollen tartans, and this is thought to be a result of the aforesaid difference. Furthermore, differential crease-resistance properties could be given to fibres by the differential application of crease-resist finishes thereto in accordance with the invention. Also, the invention is not limited to the treatment of wholly synthetic thermoplastic yarn (as evidenced by the foregoing example relating to viscose rayon) or even to other man-made fibres or filaments. Thus, a sliver of flax could have applied to it in irregular fashion a protective treatment which would result in the fibres having differential shrinkage characteristics capable of manifesting themselves after spinning under the influence of a suitable further treatment.

Furthermore, it is clear from the examples that a variety of simple means exist for endowing the particular material being treated with the desired variable latent characteristics, and for this reason the various mechanical and other means have been illustrated in diagrammatic form only. It is also clear that the group of filaments or fibres treated according to the invention may be quite small or very large. Thus, for example, a number of tows may be treated simultaneously in similar manner as in Examples 1 to 4 and supplied to a can before further processing. Furthemore, if, as has already been stated, instead of a high shrinkage tow, as described for instance in Example 1, a relaxed tow is treated, the same principles are involved except that in order to give it variable shrinkage characteristics variable stretching rather than variable relaxation takes place in the heated zone.

We claim:
1. A process of producing textile material which comprises the steps of continuously processing a tow of man-made continuous textile filaments to impart thereto a varying latent shrinkage characteristic, subdividing said continuous filaments with said latent characteristic therein into staple fibres, substantially homogeneously blending the resultant staple fibres, spinning the blended staple fibres into yarn, and thereafter developing the latent shrinkage characteristics of the spun yarn to cause the fibres thereof to shrink in varying fashion according to the latent shrinkage characteristics thereof.

2. The process of claim 1 wherein the latent shrinkage characteristic of the filaments of said tow varies longitudinally thereof.

3. The process of claim 2 wherein said latent shrinkage characteristic repeatedly varies in continuous manner longitudinally of the filaments of said tow between predetermined minimum and maximum values of significantly different values.

4. The process of claim 3 wherein the longitudinally varying shrinkage characteristic is applied uniformly to all of the filaments in said tow.

5. The process of claim 1 wherein the latent shrinkage characteristic varies from filament to filament transversely of the tow.

6. The process of claim 5 wherein said latent shrinkage characteristic varies continuously from filament to filament transversely of the tow.

7. The process of claim 1 wherein the latent shrinkage characteristic varies both longitudinally of the filaments as well as from filament to filament transversely of the tow.

8. The process of claim 1 wherein the spun yarn is treated to develop the latent shrinkage characteristics thereof prior to being assembled into fabric.

9. The process of claim 1 wherein said spun yarn is assembled into fabric prior to development of the latent shrinkage characteristics thereof.

10. The process of claim 2 wherein said filaments are processed to impart the varying latent shrinkage characteristic thereto by the steps comprising continuously applying a variable tension thereto while the same are heated and then cooled.

11. The process of claim 5 wherein said filaments are processed to impart the transversely varying latent shrinkage characteristics thereto by applying to said filaments a different but unvarying tension.

12. The process of claim 7 wherein said filaments are processed to impart said shrinkage characteristic thereto by continuously applying to said filaments a tension varying longitudinally thereof and which differs in at least a substantial number of said filaments while the same are heated and then cooled.

13. The process of claim 1 wherein said filaments are processed to impart said shrinkage characteristic thereto by variably heating said filaments while the same are in continuous motion.

References Cited by the Examiner

UNITED STATES PATENTS

| | | | |
|---|---|---|---|
| 1,898,085 | 2/1933 | Dreyfus et al. | 18—8 |
| 2,123,936 | 7/1938 | Dreyfus et al. | 18—8 |
| 2,328,074 | 8/1943 | Hunter. | |
| 2,369,395 | 2/1945 | Heymann | 28—72 |
| 2,542,595 | 2/1951 | Tornberg | 18—8 |
| 2,701,406 | 2/1955 | Bloch | 28—72 |
| 2,810,281 | 10/1957 | Appleton et al. | 28—72 |
| 2,894,802 | 7/1959 | Braunlich | 18—54 |
| 2,930,102 | 3/1960 | Hitchin et al. | 28—59.5 |
| 2,979,883 | 4/1961 | Waltz | 28—72 |
| 2,985,940 | 5/1961 | Weldon | 28—72 |
| 3,017,684 | 1/1962 | Pittman | 28—72 |
| 3,019,507 | 2/1962 | Maragliano et al. | 28—72 |
| 3,025,563 | 3/1962 | Corman et al. | 18—8 |
| 3,039,171 | 6/1962 | Hume et al. | 28—72 |
| 3,045,315 | 7/1962 | Dusenbury | 28—59.5 |
| 3,046,083 | 7/1962 | Bates et al. | 18—54 |
| 3,055,728 | 9/1962 | Kaiser | 18—54 |
| 3,061,998 | 11/1962 | Bloch | 28—72 |
| 3,081,516 | 3/1963 | Evans | 28—72 |
| 3,097,415 | 7/1963 | Davis. | |
| 3,116,197 | 12/1963 | Kasey | 57—140 |
| 3,146,574 | 9/1964 | Earnshaw | 28—72 |

FOREIGN PATENTS

| | | |
|---|---|---|
| 852,291 | 10/1960 | Great Britain. |
| 36/23,813 | 12/1961 | Japan. |

MERVIN STEIN, Primary Examiner.

RUSSELL C. MADER, DONALD W. PARKER,
Examiners.

H. G. GARNER, J. KEE CHI, Assistant Examiners.